United States Patent
Schwarz et al.

(10) Patent No.: US 7,783,559 B1
(45) Date of Patent: *Aug. 24, 2010

(54) SYSTEM AND METHOD FOR PROVIDING MARKET UPDATES IN AN ELECTRONIC TRADING ENVIRONMENT

(75) Inventors: Stephen A. Schwarz, Chicago, IL (US); Michael J. Burns, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 109 days.

This patent is subject to a terminal disclaimer.

(21) Appl. No.: 11/415,450

(22) Filed: May 1, 2006

Related U.S. Application Data

(63) Continuation of application No. 11/023,685, filed on Dec. 28, 2004.

(51) Int. Cl.
G06Q 40/00 (2006.01)
(52) U.S. Cl. .................................................. 705/37
(58) Field of Classification Search .................. 705/37
See application file for complete search history.

(56) References Cited

U.S. PATENT DOCUMENTS

| | | | | |
|---|---|---|---|---|
| 5,136,501 | A | * | 8/1992 | Silverman et al. ............ 705/37 |
| 5,924,083 | A | * | 7/1999 | Silverman et al. ............ 705/37 |
| 6,260,025 | B1 | * | 7/2001 | Silverman et al. ............ 705/37 |
| 6,772,132 | B1 | | 8/2004 | Kemp, II |
| 6,973,623 | B2 | | 12/2005 | Little et al. |
| 7,127,424 | B2 | | 10/2006 | Kemp, II et al. |
| 7,222,096 | B2 | * | 5/2007 | Anaya et al. ............ 705/37 |
| 7,366,691 | B1 | | 4/2008 | Kemp, II et al. |
| 7,389,268 | B1 | | 6/2008 | Kemp, II et al. |
| 7,392,219 | B2 | | 6/2008 | Singer et al. |
| 7,398,244 | B1 | * | 7/2008 | Keith ................. 705/37 |
| 7,426,491 | B1 | * | 9/2008 | Singer et al. ............ 705/37 |
| 7,454,382 | B1 | * | 11/2008 | Triplett ................. 705/37 |
| 2003/0069834 | A1 | * | 4/2003 | Cutler ................. 705/37 |
| 2003/0225674 | A1 | * | 12/2003 | Hughes et al. ............ 705/37 |
| 2004/0019554 | A1 | * | 1/2004 | Merold et al. ............ 705/37 |
| 2004/0225592 | A1 | * | 11/2004 | Churquina ............ 705/37 |
| 2005/0091148 | A1 | * | 4/2005 | Rotondo ................. 705/37 |
| 2005/0283415 | A1 | | 12/2005 | Studnitzer et al. |
| 2006/0259414 | A1 | | 11/2006 | Singer et al. |
| 2006/0265305 | A1 | * | 11/2006 | Schluetter et al. ............ 705/35 |
| 2006/0265314 | A1 | | 11/2006 | Singer et al. |
| 2007/0192230 | A1 | * | 8/2007 | Meacham et al. ............ 705/37 |

* cited by examiner

*Primary Examiner*—Jagdish N Patel
*Assistant Examiner*—Kenneth L Bartley
(74) *Attorney, Agent, or Firm*—McDonnell Boehnen Hulbert & Berghoff LLP

(57) ABSTRACT

A system and method are provided for modifying how market updates are provided in an electronic trading environment upon detecting one or more triggering events. One example method includes defining an event to be used to trigger modification of how market updates are provided to a client entity, receiving a market update from an electronic exchange, and, when the event is detected, modifying how the market update is provided to the client entity. As an example, the modification of how the market update is provided to the client entity may include providing less data in relation to market updates, and sending the market updates less frequently.

20 Claims, 4 Drawing Sheets

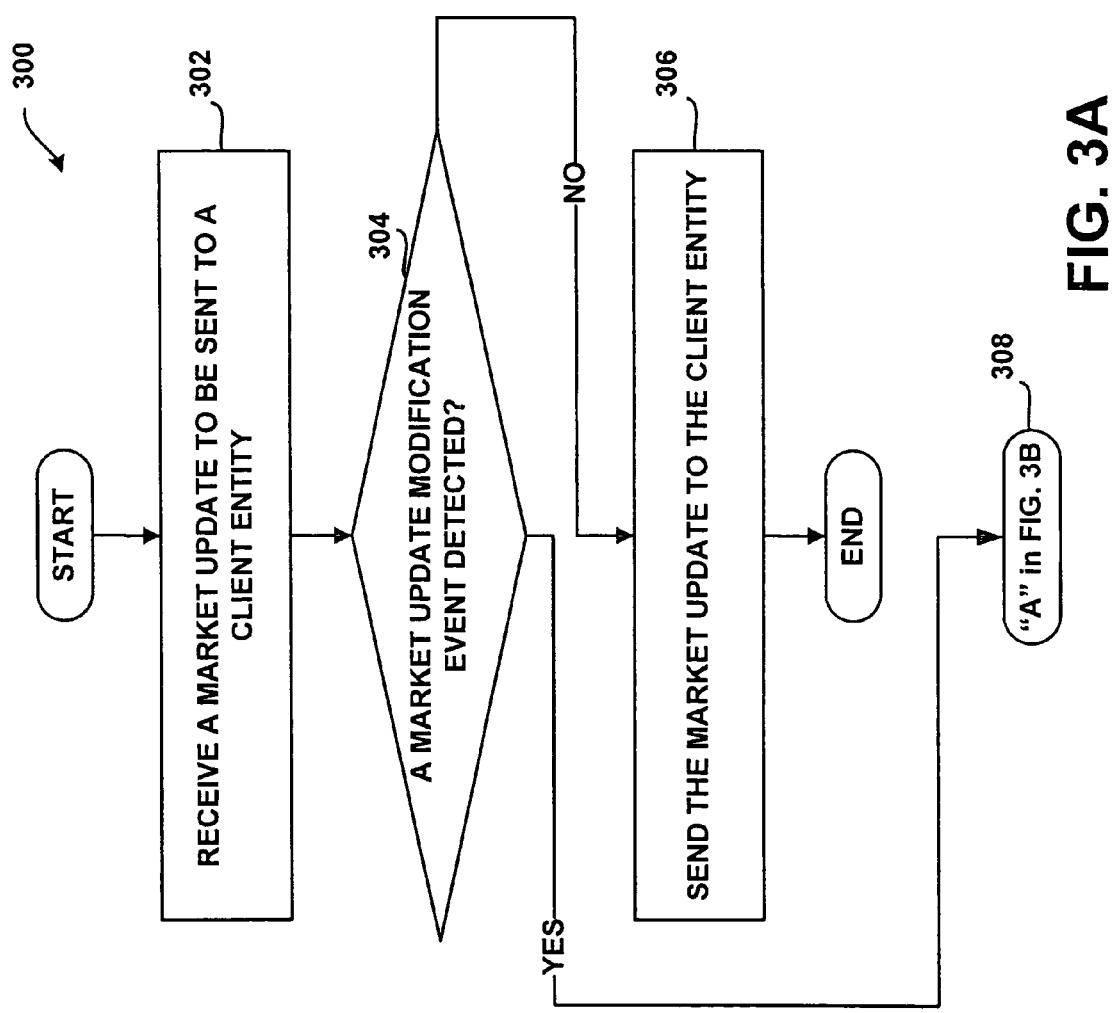

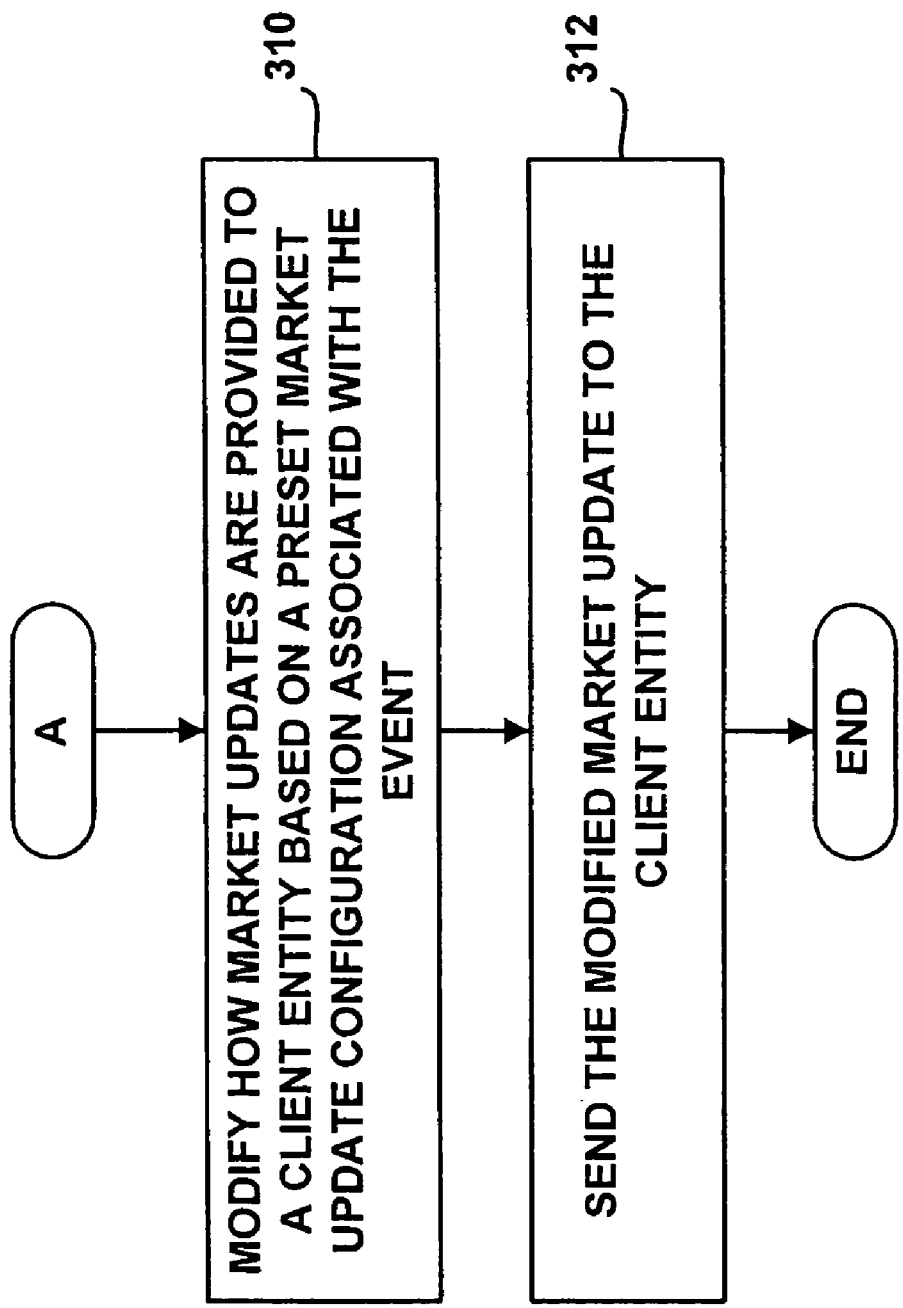

SYSTEM AND METHOD FOR PROVIDING MARKET UPDATES IN AN ELECTRONIC TRADING ENVIRONMENT

CROSS REFERENCE TO RELATED APPLICATION

This application is a continuation of U.S. patent application Ser. No. 11/023,685, filed Dec. 28, 2004, the contents of which are fully incorporated herein by reference.

TECHNICAL FIELD

The present invention is directed to electronic trading. More specifically, the present invention is directed to modifying market information updates being sent to traders in an electronic trading environment based on changing market conditions.

BACKGROUND

An exchange is a central marketplace with established rules and regulations where buyers and sellers, referred to as traders, meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. Electronic exchanges have made it possible for an increasing number of people to actively participate in a market at any given time. The increase in the number of potential market participants has led to, among other things, a more competitive market and greater liquidity.

With respect to electronic exchanges, traders may connect to an electronic exchange trading platform by way of a communication link through their user terminals. Once connected, traders may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

An electronic exchange typically provides a matching process between buying and selling traders. Some example exchanges are Eurex, LIFFE, CME, and CBOT. Client entities, such as computers being used by traders to trade, are typically connected to an electronic exchange by way of a communication link to facilitate electronic messaging between the trading entities and the exchange. The messaging may include market information that is distributed from the electronic exchange to traders, as well as orders, quotes, acknowledgements, fills, cancels, deletes, cancel and replace, and other well-known financial transaction messages. For example, once a trader at the client entity receives the market information, it may be displayed to him on his trading screen. Upon viewing the market information, traders can take certain actions including the actions of sending buy or sell orders to the electronic market, adjusting existing orders, deleting orders, or otherwise managing orders. Traders may also use software tools on their client devices to automate these and additional actions.

Although the amount or type of market information published by an electronic exchange often differs, there are some standard pieces of information. For instance, market information usually includes the inside market, which is generally the current lowest sell price (often referred to as the best ask) and the current highest buy price (often referred to as the best bid). Market information may also include market depth, which generally refers to quantities available in the market at the price levels other than those corresponding to the inside market. In addition to providing order book information including price and quantity information, electronic exchanges can offer other types of market data such as the open price, settlement price, net change, volume, last traded price, last traded quantity, and order fill information.

Generally, there are two models that are used by electronic exchanges to deliver market information to client terminals. The first model involves sending a snapshot update at a programmed time interval. A snapshot update is a message that contains market information such as the inside market and market depth. The first model has a few shortcomings. Most importantly, it may not always be very accurate from the trader's point of view, since the trader may miss a lot of updates that occur in between the intervals of receiving the snapshot updates. The second model involves sending incremental updates every time the inside market or market depth changes in the market depth, thus, providing a rapid response to changing market conditions. However, when the network bandwidth or client processing capabilities are surpassed, incremental price updates are generally queued in a first in, first out (FIFO) manner. Unfortunately, the second model can result in a deep queue (a queue with lots of lined-up incremental updates), and the deep queue may cause a client entity to receive old incremental updates before the most up to date data is received.

With the increasing usage of automated trading tools that automatically submit orders for traders based on changing market conditions, and due to a constantly increasing number of traders trading at the exchanges, the number of updates that are received from the exchange is constantly increasing. Therefore, it is important to develop more intelligent tools that can provide more up to date market updates.

BRIEF DESCRIPTION OF THE DRAWINGS

Example embodiments of the present invention are described herein with reference to the following drawings, in which:

FIGS. 3A and 3B are a flow chart illustrating an example embodiment of a method for processing and modifying market information updates.

DETAILED DESCRIPTION

I. Modified Market Updates Overview

The example embodiments are directed to, among other things, how market updates are provided in an electronic trading environment. One example method includes defining an event, and using the event as a trigger to modify how market updates are provided to a client entity. More specifically, the method includes receiving a market update from an electronic exchange, and, upon detecting the event, modifying how the market update is provided to the client entity. The event may include any statically defined event, such as a time period, or a dynamic event that can be detected based on an increased output of market data, or yet some other data. When an event is detected, the content of each market update could be modified, such that fewer market depth levels could be provided to one or more client entity. Also, a time interval between sending two consecutive updates, often referred to as a price coalescing time interval, could be increased or decreased upon detecting one or more predefined events. Different embodiments will be described in greater detail below.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

Figure 1:
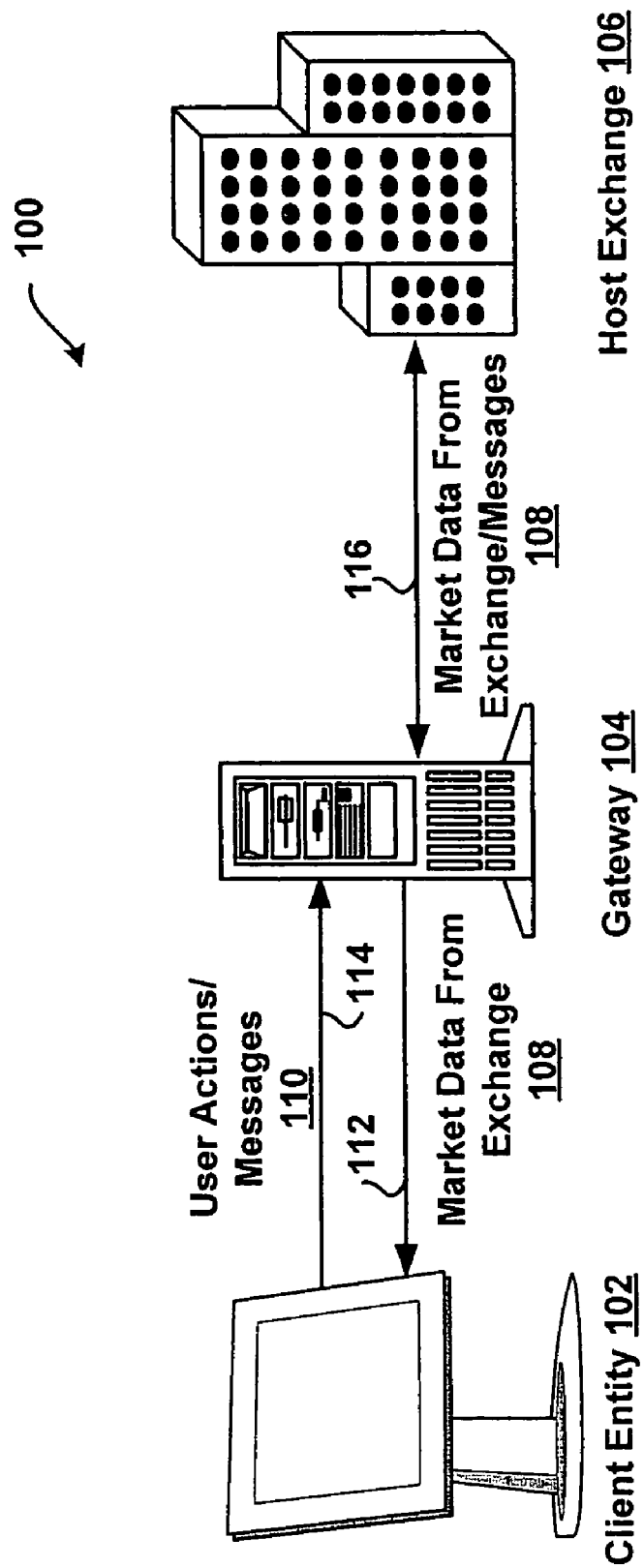
FIG. 1 is a block diagram illustrating an example network configuration for a communication system utilized to access one or more exchanges.

In an electronic trading environment, when an authorized trader selects a tradeable object, the trader may access market data related to the selected tradeable object(s). Referring to FIG. 1, an example communication that might occur between an electronic exchange and a client entity in accordance with the example embodiments is shown. During a trading session, market data 108, in the form of messages, may be relayed from a host exchange 106 over communication links 116 and 112 to a client entity generally indicated as 102. The client entity 102 may be a single client terminal that is used by a single trader or multiple client terminals corresponding to multiple traders associated with one or more trading groups. As illustrated in FIG. 1, intermediate devices, such as gateway(s) 104, may be used to facilitate communications between the client entity 102 and the host exchange 106. It should be understood that while FIG. 1 illustrates the client entity 102 communicating with a single host exchange 106, in an alternative embodiment, the client entity 102 could establish trading sessions to more than one host exchange. Also, it should be understood that information being communicated between the client entity 102 and the exchange 106 could be communicated via a single communication path.

The market data 108 contains information that characterizes the tradeable object's, including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client entity 102. Upon viewing the market information or a portion thereof, a trader may wish to take actions, such as send orders to an exchange, cancel orders at the exchange, or change order parameters, for example. To do that, the trader may input various commands or signals into the client entity 102. Upon receiving one or more commands or signals from the trader, the client entity 102 may generate messages that reflect the actions taken, generally shown at 110. It should be understood that different types of messages or order types can be submitted to the host exchange 106, all of which may be considered various types of transaction information. Once generated, user action messages 110 may be sent from the client entity 102 to the host exchange over communication links 114 and 116.

The client entity 102 may use software that creates specialized interactive trading screens on the client entity 102. The trading screens enable traders to enter and execute orders, obtain market quotes, and monitor positions. The range and quality of features available to the trader on his or her screens varies according to the specific software application being run. In addition to or in place of the interactive trading screens, the client entity 102 may run automated non-interactive types of trading applications.

A commercially available trading application that allows a user to trade in systems like those shown in FIG. 1 and subsequent figures is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. As mentioned above, the scope of the example embodiments described herein are not limited by the type of terminal or device used, and are not limited to any particular type of trading application. Portions of the X_TRADER® and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, now U.S. Pat. No. 7,127,424, and U.S. patent application Ser. No. 10/125,894, entitled "Trading Tools for Electronic Trading," filed on Apr. 19, 2002, the contents of each are incorporated herein by reference.

III. Example System Function and Operation

In one example embodiment, system and methods described hereinafter can be used when an electronic exchange sends a large number of market updates. However, the example methods are not limited to fast market conditions, and could be used in relation to different embodiments as well. For example, the methods described herein could be beneficial when used in relation to client entities with limited processing power.

The example system and methods can be used to modify the content of each market update that is provided to a client entity. In one example embodiment, when a trader first logs in, a client entity may receive a snapshot of all market levels including prices and quantities. For example, an exchange may provide five levels of market depth in addition to the inside market. Afterwards, the client entity may receive an update for each price level at which a new quantity has been detected. In one example embodiment, upon detecting a triggering event, a fewer market levels could be provided to a client entity. For example, a new market snapshot could be provided upon detecting the triggering event, and the new market snapshot could include fewer market levels (price levels and corresponding quantities) than the original market snapshot. Referring to the example above with the exchange providing five levels of market depth, four or even fewer levels of market depth could be provided when an event is detected. Then, when a new quantity is detected in relation to one of the price levels provided in the new market snapshot, an update including a new quantity and its corresponding price level can be provided to a client entity. In such an embodiment, fewer market updates will be provided to a client entity as compared to an embodiment where market updates are provided for all price levels. Using such an embodiment, since the processing time that is used for generating the modified market updates at the gateway, as well as the processing time at the client entity, is decreased, a trader at the client entity may receive more up to date market information. Different example embodiments will be described in greater detail below.

In addition to modifying the number of market levels that are provided to a client entity upon detecting a triggering event, different actions could be taken as well. For example, a server at a gateway may stop providing certain types of data upon detecting a triggering event. The types of data may include any market related parameters that are calculated at the server, including, but not limited to, any theoretical values, implied prices and quantities, and many others. Different embodiments are possible as well. For example, rather than completely stopping sending the additional parameters, the parameters could be provided to a client entity at certain time intervals. Also, as will be described in greater detail below, in addition to modifying the content of market updates, the modified market updates could be provided to a client entity more frequently, as compared to normal market conditions.

In another embodiment, an alert may be provided to a trader before any steps of modifying how market data is provided to a client entity are taken. In such an embodiment, a trader could be given an option of either receiving modified market data or continuing to receive unmodified data and taking a risk of receiving delayed updates. It should be understood that any alerts could be used, and an alert could be visual, audio, or a combination thereof. Also, a selection input could be provided for a trader to either accept or reject the possibility of receiving modified market updates.

Figure 2:
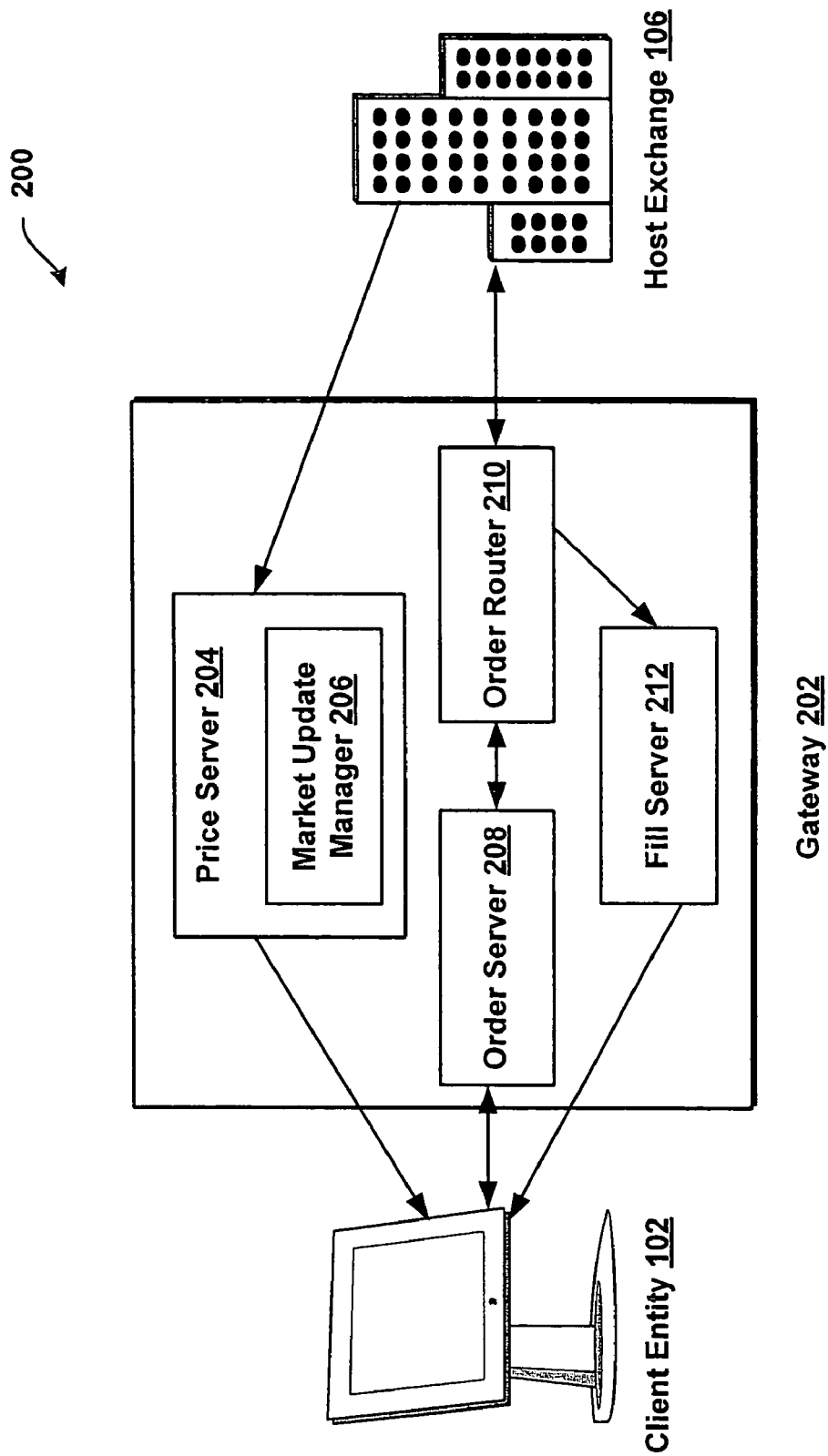
FIG. 2 is a block diagram illustrating an example embodiment of a system for processing and modifying market information updates.

FIG. 2 is an example system 200 illustrating a plurality of components that can be used to process market data being provided by an electronic exchange according to the example embodiments. The system 200 includes the client entity 102 communicating with the exchange 106 via a gateway 202. The gateway 202 includes a number of servers to support data feeds and messages being sent from the client entity 102 to the exchange 106 and vice versa. In the example embodiment, the gateway 202 includes a price server 204 for processing price information, an order server 208 for processing order information, a fill server 212 for processing fill information, and an order router 210 for making routing decisions, such as decisions relating to which client entity should receive an order update that is provided by the exchange 106. It should be understood that the servers illustrated in FIG. 2 may run on the same entity or could be distributed among a number of entities. Also, the components and functionality described herein can be implemented at the exchange 106, and the exchange 106 rather than a server could perform some or all actions described herein in relation to methods of how market updates are provided to the client entity 102.

A trader at the client entity 102 can subscribe to price information, order information, and fill information for the exchange. Then, once the client entity 102 has subscribed to the information, the gateway 202 may publish the information to the client entity. When the price server 204 receives market information from the exchange 104, it may process the received data before sending it to the client entity 102. Processing of data, among other actions, may include converting the data to a proper format being used at the client entity 102. Also, the price server 204 may calculate additional values that are not directly provided by the exchange 106. For example, the price server 204 may determine implied order information and provide the implied order information with every update being sent to the client entity 102. An implied order is made up of an implied price and its implied quantity. Implied prices and quantities are derived from direct orders in a combination of outright markets and spreads/strategies. For example, orders in outright markets may imply orders (referred to as an "implied in" orders) into a spread market, and orders in a spread market plus orders in an outright market may imply orders (referred to as an "implied out" orders) into another outright market. However, different parameters could be calculated as well, such as theoretical prices that could be determined based on any user-defined formulas, total traded quantity at a price, and many others.

As shown in FIG. 2, the price server 204 also includes a market update manager 206. The market update manager 206 may manage the content of market updates that are provided to the client entity 102, as well as the frequency of sending price updates to the client entity 102, often referred to as price coalescing intervals. It should be understood that many different methods could be used to coalesce market data. In one embodiment, the price server 204 could collect all changes for a predetermined time period and then send all collected data to the client entity 102 at the end of the predefined time period. In another embodiment, the price server 204 could collect data and only send the most up to date market data to the client entity 102, so that, for example, if two different quantities are detected during the predefined time period, the price server 204 would only send the latest quantity.

In one example embodiment, the market update manager 206 may allow configuration of multiple sets of update configurations to be used for determining how to provide market updates to the client entity 102. Each update configuration may contain an update modification time period or events to be used as triggers for modifying market updates. The update configuration may also define the content of each market update to be provided during each predefined time period, or during the occurrence of an event, associated with the update configuration, and/or a price coalescing interval to be used at the price server 204 between sending two consecutive updates.

In one embodiment, a trader may manually configure a plurality of time periods during which the market updates and/or price coalescing intervals are to be modified based on the rules in the update configurations. For example, such time periods may be based on predictable time periods during which a large number of updates is typically received from the exchange 106 due to announcements of different numbers, such as an unemployment number, or due to some other events that may trigger fast market conditions at an electronic exchange.

Alternatively, rather than using statically-defined time periods, the market update manager 206 may be configured to monitor market conditions and then dynamically provide market update modification triggers to the price server 204 to modify market updates upon detecting one or more predefined events. In such an embodiment, a trader may preconfigure a number of events that can be used to generate the market update modification triggers. It should be understood that the events could be based on any market related data, or some other non-market related triggers. For example, the market update manager 206 can be configured to monitor the rate at which the market updates are being received from the electronic exchange 106, and, if the rate exceeds a predefined rate, the market update manger 206 can generate a market update modification trigger and provide the trigger to the price server 204. The trigger may then initiate the action of modifying the content of market updates and/or the length of price coalescing interval between sending each consecutive modified market update to the client entity 102 during the occurrence of the detected event. It should be understood that the combination of statically defined time periods and dynamically detectable events could be used to trigger modification of how the market updates are provided to the client entity 102.

It should be understood that many different methods could be used to monitor the rate of receiving market updates at the price server 204. For example, a moving average or yet some other method could be used to determine if the number of market updates detected for the current time period exceeds the number of market updates that were received in the preceding time period. Then, if the number exceeds some predefined threshold, the market update manager 206 may generate a market update modification trigger for the price server 204. Also, many different triggers could be defined, with each trigger corresponding to different rates, and causing different changes to market updates. In such an embodiment, for example, as different triggers are activated based on the progressively increasing rate of receiving market updates, different changes could be applied to the market updates.

Different market data modification rules and price coalescing intervals could be configured for use in relation to each event that triggers modifications of market updates. For example, the price server 204 can provide fewer market depth levels upon detecting a high market update rate as compared to the number of market depth levels to be provided in relation to a low market update rate. In such an embodiment, when fewer market depth levels are provided in the market updates, the price server 204 can generate each update much quicker, and the price coalescing time intervals between sending each update can be reduced so that the client entity 102 can receive more frequent market updates. Similarly, when the market update rate decreases, the price server 204 could then supply more price levels in each market depth update, and a longer price coalescing interval could be used for sending the market updates to the client entity 102.

As mentioned earlier, an update configuration could define the content of each market update and a price coalescing interval to be used for sending the modified market updates to the client entity 102. One example update configuration could include an event to be used as a trigger to modify a market update, a number of market depth levels to be provided in relation to each update when the event is detected, and the length of a price coalescing interval to be used for sending each consecutive modified market update during the occurrence of the event. It should be understood that a trader could define a global update configuration to be applied to all tradeable object being traded by the trader. Alternatively, each tradeable object could be associated with a different update configuration, so that, for example, one set of update configurations could be applied to market updates being received for a first tradeable object, and another set of update configurations could be applied to market updates corresponding to another tradeable object.

Table 1 shows example update configurations for three market update rates.

TABLE 1

| Market update per second "x" | Number of depth levels | Coalescing interval (ms) |
|---|---|---|
| 50 < x < 75 | 10 | 200 |
| 75 < x < 100 | 8 | 150 |
| x > 100 | 4 | 100 |

According to the update configurations in Table 1, when the market update manager 206 detects that the price server 204 receives between 50 and 75 updates per second, the market update manager 206 can limit the number of depth levels to 10, and a price coalescing time interval can be set to 200 milliseconds. Then, when the market update manager 206 detects that the price server 204 receives between 75 and 100 market updates per seconds, the number of depth levels to be provided in each market update can be limited to 8, and the price coalescing time interval can be set to 150 milliseconds, so that the client entity 102 will receive more frequent updates having fewer market levels. Then, according to the last update configuration in Table 1, when the market update manager 206 detects that the price server 204 receives more than 100 market updates per second, the number of depth levels can be limited to 4, and the price coalescing time interval can be decreased to 100 milliseconds.

It should be understood that the update configurations illustrated in Table 1 are only examples, and different update configuration rules could be defined as well. Also, the number of depth levels in each update configuration could correspond to the total number of market depth levels including bids and asks. Alternatively, one number of depth levels could be defined for market depth levels corresponding to bids and another number of depth levels could be defined for market depth levels corresponding to asks. In another embodiment, the update configuration could include one or more percentages to be used to determine the number of market depth levels in each update. For example, if an update configuration defines 20%, the market update manager 206 can decrease the received number of market depth levels by 20%. The use of percentages could be especially beneficial if a trader defines a set of update configurations to be used in relation to multiple tradeable objects being traded at more than one exchange, while each exchange provides a different number of market depth levels. In such an embodiment, the decrease in the market update levels that are provided in the modified updates may be determined by applying the predetermined percentage to the number of market depth levels being received in each update, rather than defining a different number in relation to each tradeable object.

In another embodiment, a static reduction value can be defined in relation to each market update rate, so that regardless of how many market depth levels are provided by an exchange, the number of market depth levels can be reduced by the same pre-defined value. A potential problem may arise when relatively large static reduction values are used in relation to the market updates being received from an exchange that provides a low number of market depth levels. In such an embodiment, the application of the static reduction values to the market depth levels provided by such an exchange could potentially result in no market depth levels being provided to the client entity 102. To prevent such a problem, a trader could define a minimum number of market depth levels to be provided in each modified update from the price server 204. For example, the minimum number of market depth levels could be defined to include one market level, such as the inside market levels, i.e., market levels corresponding to the best bid and the best ask; however, different configurations are possible as well.

It should be understood that the update configurations described above are only examples, and different embodiments are possible as well. In addition to defining market parameters to be provided in relation to a tradeable object for which a modified market update is to be provided, an update configuration could also include a number of rules that could affect other tradeable objects being traded by a trader. For example, an update configuration could include a rule according to which the market update manager 204 could disable data feeds for specific tradeable objects being rarely traded by a trader so that, during the occurrence of one or more events specified in the update configuration, the trader will not receive any update information for the specified tradeable objects, thus, further reducing the processing time at the price server 202.

Different embodiments are possible as well. For example, upon detecting a triggering event, the price server 202 could only send inside market data, and stop sending other parameters being calculated at the price server 202. Also, rather than entirely discontinuing sending market information related to some market depth levels, the price server 202 could provide a consolidated quantity value, including a sum of available quantities at the market depth levels for which the price server 202 temporarily discontinued sending data.

FIGS. 3A and 3B are a flow diagram illustrating a method 300 for providing market updates to a client entity according to one example embodiment. It should be understood that each block may represent a module, segments, or portions of code, and may include one or more executable instructions for implementing specific logical functions or steps in the process. Alternate implementations are included within the scope of the example embodiment of the present invention in which functions may be executed out of order from that shown or discussed, including substantially concurrently or in reverse order, depending on the functionality involved, as would be understood by those reasonably skilled in the art of the present invention. The flow diagram 300 will be described in relation to the elements of the client terminal in FIG. 2. However, it should be understood that more, fewer, or different components could also be used to execute the method 300.

Referring to FIG. 3A, at 302, the price server 204 receives a market update to be sent to the client entity 102. In one example embodiment, the price server 204 receives the market update from the electronic exchange 106, and the market update includes market information for at least one tradeable object being traded by a trader at the client entity 102.

At step 304, the market update manager 206 determines if a market update modification event has been detected. The market update modification event can be user configurable and can take many different formats. For example, as defined in earlier paragraphs, the market update modification event could correspond to a static time period, or any dynamically determined event, such as the rate of market updates being received at the price server 204 from the electronic exchange 106. However, different events, or the combination of events, could be defined as well. If a combination of events are defined, preferably all events have to be satisfied before modifying any market data being provided to the client entity 102.

According to one example embodiment, if a plurality of update modification events are defined, each market update modification event can be associated with one or more update configurations defining how each market update is to be modified before it is sent to the client entity 102 during the occurrence of the event. One example market update configuration, as defined earlier, can include a number of market depth levels to be provided in each market update during the occurrence of the event.

The market update configuration could also define a price coalescing interval to be used at the price server 204 to determine the frequency of sending the modified market updates to the client entity 102. Also, as mentioned in earlier paragraphs, the market update configuration could define which of the additional parameters that are calculated at the price server 204 will be provided in each update when one or more predefined events are detected. For example, the update configuration could specify that no implied prices/quantities should be calculated or provided in any market update when the event is triggered. However, different parameters could be specified as well.

Referring back to step 304, if the market update modification event is not detected, at step 306, the price server 204 processes the market update that has been received from the electronic exchange using a standard processing method, and the market update including any additional parameters that are computed at the price server 204 is sent to the client entity 102, as shown at step 306.

However, if the market update manager 206 detects the occurrence of one or more market update modification events, the method 300 continues at step 310 in FIG. 3B, as shown at 308. At step 310, the price server 204 modifies how market updates are provided to the client entity 102. For example, the price server 204 could modify the content of market updates that are provided to the client entity 102 based on the preset update configuration associated with the detected event(s). In addition to modifying the content, the price server 204 could also modify how often each market update is provided to the client entity 102. Also, if the update configuration defines a price coalescing interval, the price server 202 may use the predefined interval to determine the frequency of sending the modified market updates to the client entity 102. For example, the price server 202 could determine when the last update was sent to the client entity 102 and then wait the predefined price coalescing time interval before sending the modified update to the client entity 102. Then, at step 312, the price server 204 provides the modified market update to the client entity.

The above description of the example embodiments, alternative embodiments, and specific examples, are given by way of illustration and should not be viewed as limiting. Also, many changes and modifications within the scope of the present embodiments may be made without departing from the spirit thereof, and the present invention includes such changes and modifications.

It will be apparent to those of ordinary skill in the art that methods involved in the system and method for providing market updates to a client entity may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A computer-implemented method for providing market updates in an electronic trading environment, the method including:
   receiving by a gateway a definition for a first event, wherein the definition for the first event includes a rate market data is received from an electronic exchange;
   receiving by the gateway market data from the electronic exchange, wherein the market data is related to a tradeable object being traded at the electronic exchange, wherein the market data includes market depth information for the tradeable object;
   generating by the gateway a first market update to be sent to a client entity, wherein the first market update includes a first set of market depth levels, wherein each market depth level in the first set is based on the market depth information and includes a quantity available for trading the tradeable object at a price level, wherein the first set includes a first number of market depth levels;
   sending by the gateway the first market update to the client entity;
   determining by the gateway whether the first event has been detected, wherein the first event is detected when the rate market data is received from the electronic exchange conforms to the rate defined for the first event;
   generating by the gateway a second market update to be sent to the client entity, wherein the second market update includes a second set of market depth levels, wherein each market depth level in the second set is based on the market depth information and includes a quantity available for trading the tradeable object at a price level, wherein the second set includes a second number of market depth levels, wherein the second number of market depth levels is determined based on detection of the first event, and wherein the second number of market depth levels is different from the first number of market depth levels in response to the first event being detected; and
   sending by the gateway the second market update to the client entity.

2. The method of claim 1, wherein the first event is detected based at least in part on a moving average of the rate market data is received.

3. The method of claim 1, wherein the first event is detected when the rate market data is received exceeds a threshold.

4. The method of claim 1, wherein the first event is detected when the rate market data is received for a current time period is different from the rate market data is received for a preceding time period.

5. The method of claim 1, wherein the second set of market depth levels includes an equal number of market depth levels for bids and asks.

6. The method of claim 1, wherein the second set of market depth levels includes an unequal number of market depth levels for bids and asks.

7. The method of claim 1, wherein the second number of market depth levels is further based on a percentage.

8. The method of claim 1, wherein the second number of market depth levels is further based on a static value.

9. The method of claim 1, further including receiving by the gateway definitions for a plurality of events, wherein the plurality of events includes the first event, wherein the second number of market depth levels is determined based on the detection of at least one of the plurality of events.

10. The method of claim 1, wherein the gateway includes a plurality of processing components positioned at one or more locations on a network.

11. A computer-implemented method for providing market updates in an electronic trading environment, the method including:
    receiving by a gateway a definition for a first event, wherein the definition for the first event includes a rate market data is received from an electronic exchange;
    receiving by the gateway market data from the electronic exchange, wherein the market data is related to a tradeable object being traded at the electronic exchange;
    generating by the gateway a first market update to be sent to a client entity, wherein the first market update includes a first set of market related parameters calculated based on the market data, wherein the first set includes a first number of market related parameters;
    sending by the gateway the first market update to the client entity;
    determining by the gateway whether the first event has been detected, wherein the first event is detected when the rate market data is received from the electronic exchange conforms to the rate defined for the first event;
    generating by the gateway a second market update to be sent to the client entity, wherein the second market update includes a second set of market related parameters calculated based on the market data, wherein the second set includes a second number of market related parameters, wherein the second number of market related parameters is determined based on detection of the first event, and wherein the second number of market related parameters is different from the first number of market related parameters in response to the first event being detected; and
    sending by the gateway the second market update to the client entity.

12. The method of claim 11, wherein the first event is detected based at least in part on a moving average of the rate market data is received.

13. The method of claim 11, wherein the first event is detected when the rate market data is received exceeds a threshold.

14. The method of claim 11, wherein the first event is detected when the rate market data is received for a current time period is different from the rate market data is received for a preceding time period.

15. The method of claim 11, wherein the second number of parameters is further based on a percentage.

16. The method of claim 11, wherein the second number of parameters is further based on a static value.

17. The method of claim 11, further including receiving by the gateway definitions for a plurality of events, wherein the plurality of events includes the first event, wherein the second number of market related parameters is determined based on the detection of at least one of the plurality of events.

18. The method of claim 11, wherein the gateway includes a plurality of processing components positioned at one or more locations on a network.

19. A computer readable medium having stored therein instructions for execution on a computer to perform the following method steps:
- receiving by a gateway a definition for a first event, wherein the definition for the first event includes a rate market data is received from an electronic exchange;
- receiving by the gateway market data from the electronic exchange, wherein the market data is related to a tradeable object being traded at the electronic exchange, wherein the market data includes market depth information for the tradeable object;
- generating by the gateway a first market update to be sent to a client entity, wherein the first market update includes a first set of market depth levels, wherein each market depth level in the first set is based on the market depth information and includes a quantity available for trading the tradeable object at a price level, wherein the first set includes a first number of market depth levels;
- sending by the gateway the first market update to the client entity;
- determining by the gateway whether the first event has been detected, wherein the first event is detected when the rate market data is received from the electronic exchange conforms to the rate defined for the first event;
- generating by the gateway a second market update to be sent to the client entity, wherein the second market update includes a second set of market depth levels, wherein each market depth level in the second set is based on the market depth information and includes a quantity available for trading the tradeable object at a price level, wherein the second set includes a second number of market depth levels, wherein the second number of market depth levels is determined based on detection of the first event, and wherein the second number of market depth levels is different from the first number of market depth levels in response to the first event being detected; and
- sending by the gateway the second market update to the client entity.

20. A computer readable medium having stored therein instructions for execution on a computer to perform the following method steps:
- receiving by a gateway a definition for a first event, wherein the definition for the first event includes a rate market data is received from an electronic exchange;
- receiving by the gateway market data from the electronic exchange, wherein the market data is related to a tradeable object being traded at the electronic exchange;
- generating by the gateway a first market update to be sent to a client entity, wherein the first market update includes a first set of market related parameters calculated based on the market data, wherein the first set includes a first number of market related parameters;
- sending by the gateway the first market update to the client entity;
- determining by the gateway whether the first event has been detected, wherein the first event is detected when the rate market data is received from the electronic exchange conforms to the rate defined for the first event;
- generating by the gateway a second market update to be sent to the client entity, wherein the second market update includes a second set of market related parameters calculated based on the market data, wherein the second set includes a second number of market related parameters, wherein the second number of market related parameters is determined based on detection of the first event, and wherein the second number of market related parameters is different from the first number of market related parameters in response to the first event being detected; and
- sending by the gateway the second market update to the client entity.

* * * * *